United States Patent
Zanetti (10) Patent No.: US 9,664,293 B2
(45) Date of Patent: May 30, 2017

(54) VACUUM VALVE

(71) Applicant: VAT Holding AG, Haag (CH)

(72) Inventor: Claudio Zanetti, Zizers (CH)

(73) Assignee: VAT HOLDING AG, Haag (CH)

( * ) Notice: Subject to any disclaimer, the term of this patent is extended or adjusted under 35 U.S.C. 154(b) by 0 days.

(21) Appl. No.: 14/952,000

(22) Filed: Nov. 25, 2015

(65) Prior Publication Data

US 2016/0153567 A1 Jun. 2, 2016

(30) Foreign Application Priority Data

Nov. 28, 2014 (AT) .................................. A 861/2014

(51) Int. Cl.
| F16K 3/314 | (2006.01) |
| F16K 27/04 | (2006.01) |
| F16K 51/02 | (2006.01) |
| F16K 3/14 | (2006.01) |

(52) U.S. Cl.
CPC ................ F16K 3/314 (2013.01); F16K 3/14 (2013.01); F16K 27/047 (2013.01); F16K 51/02 (2013.01)

(58) Field of Classification Search
CPC ... F16K 3/12; F16K 3/14; F16K 3/314; F16K 27/047; F16K 3/184; F16K 3/186
USPC ....... 251/193, 326–329, 195, 197, 198, 199, 251/200, 201, 202, 203–204
See application file for complete search history.

(56) References Cited

U.S. PATENT DOCUMENTS

| 2,075,123 | A | * | 3/1937 | Lunken | .................... F16K 3/314 251/327 |
| 2,948,503 | A | * | 8/1960 | Williams | ................... F16K 3/14 251/327 |
| 3,215,399 | A | * | 11/1965 | McInerney | ............. F16K 3/314 251/195 |
| 3,387,818 | A | * | 6/1968 | Siepmann | ................. F16K 3/14 251/327 |
| 3,854,697 | A | * | 12/1974 | Salloga | ................... F16K 3/184 251/167 |
| 3,871,615 | A | * | 3/1975 | Donner | ............... F16K 31/0668 251/129.19 |

(Continued)

FOREIGN PATENT DOCUMENTS

DE 102013006123 10/2013

*Primary Examiner* — Kevin Murphy
*Assistant Examiner* — David Colon Morales
(74) *Attorney, Agent, or Firm* — Volpe and Koenig, P.C.

(57) ABSTRACT

A vacuum valve includes a valve housing with a valve opening, a closure member, a valve rod on which the closure member is mounted and which is axially adjustable for adjusting the closure member between open and closed positions, an elastic seal arranged on a front side of the closure member or on the valve seat of the housing, a sealing surface arranged on the other of these, and against which the seal abuts in the closed position, and at least one support part arranged on a rear side of the closure member remote from the valve seat. The abutment between the support surface of the support part and the valve housing is effected in an abutment plane which is inclined in relation to the displacement direction about an axis which is at right angles to both the displacement direction and the longitudinal axis. The support part is pivotable in relation to the closure member about a pivot axis, which is at right angles to both the displacement direction and the longitudinal axis of the valve opening.

8 Claims, 7 Drawing Sheets

(56) References Cited

U.S. PATENT DOCUMENTS

| | | | | | |
|---|---|---|---|---|---|
| 3,926,408 | A | * | 12/1975 | Vogeli | F16K 27/047 251/327 |
| 3,938,779 | A | * | 2/1976 | Benjamin | F16K 3/12 251/268 |
| 4,225,115 | A | * | 9/1980 | Miller | F16K 27/047 251/327 |
| 4,294,427 | A | * | 10/1981 | Cilny | F16K 3/14 251/158 |
| 4,301,993 | A | * | 11/1981 | Waller | F16K 3/14 251/167 |
| 4,367,766 | A | * | 1/1983 | Uomala | F16K 3/12 137/243 |
| 4,389,037 | A | * | 6/1983 | Anders | F16K 3/12 251/326 |
| 4,706,934 | A | * | 11/1987 | Brown | F16K 3/184 251/167 |
| 5,013,009 | A | * | 5/1991 | Nelson | F16K 3/12 251/203 |
| 5,556,074 | A | * | 9/1996 | O'Brien | F16K 27/044 251/326 |
| 5,662,308 | A | * | 9/1997 | Nevrekar | F16K 3/12 251/195 |
| 6,367,770 | B1 | * | 4/2002 | Duelli | F16K 3/0227 251/175 |
| 7,011,294 | B1 | | 3/2006 | Ehrne et al. | |
| 2012/0298904 | A1 | * | 11/2012 | Geiser | F16K 3/14 251/359 |
| 2013/0277590 | A1 | | 10/2013 | Geiser et al. | |

\* cited by examiner

VACUUM VALVE

INCORPORATION BY REFERENCE

The following documents are incorporated herein by reference as if fully set forth: Austrian Patent Application No. A861/2014, filed Nov. 28, 2014.

BACKGROUND

The invention relates to a vacuum valve including a valve housing which comprises a valve opening, which comprises a longitudinal axis, and a valve seat which surrounds the valve opening, a closure member which is adjustable between an open position, in which the vacuum valve is open, and a closed position, in which the vacuum valve is closed, a valve rod on which the closure member is mounted and which is axially adjustable in a displacement direction and in an opposite direction for adjusting the closure member between the open position and the closed position, an elastic seal which is arranged on a front side of the closure member or on the valve seat of the valve housing, a sealing surface which is arranged on the valve seat of the valve housing or on the front side of the closure member, and against which the seal abuts in the closed position of the closure member, and at least one support part which is arranged on a rear side of the closure member remote from the valve seat and comprises a support surface which is supported on the valve housing in the closed position of the closure member, wherein the abutment between the support surface and the valve housing is effected in an abutment plane which is inclined in relation to the displacement direction about an axis which is at right angles to the displacement direction and at right angles to the longitudinal axis of the valve opening.

A vacuum valve of this type proceeds from U.S. Pat. No. 7,011,294 B1. In the case of the vacuum valve described in this publication, the closure member is realized in a wedge-shaped manner and is displaced as a result of an axial displacement of the valve rod, on which the closure member is mounted, between its open and closed position. Sliding and spacer parts are arranged on the front side of the closure member next to the seal. These sliding and spacer parts as well as the support parts arranged on the rear side of the closure element form a sliding bearing arrangement for the closure member when closing the valve over a last part portion of the adjustment path of the closure member up to achieving the closed position of the same. In spite of the shear stress acting on the seal when the vacuum valve is closed, a service life for the seal that is sufficient for many applications can be achieved in this connection. Even the particle generation can be kept to a sufficiently low level.

In the case of many types of vacuum valves, attempts are made, in contrast, to avoid shear stress on the seal as much as possible. In this connection, L-valves, pendulum valves, butterfly valves and sliding valves with expanding members are known in various embodiments.

Due to the manufacturing tolerances of the valve housing and/or of the closure member, in the case of the vacuum valve disclosed in U.S. Pat. No. 7,011,294 B1, the seal can be pressed in a non-uniform manner over its periphery, in particular where the closure member has a larger nominal width. This can result in the closed vacuum valve not sealing fully and/or the seal being exposed to increased local stresses, as a result of which the wear thereof increases and the service life is reduced. U.S. Pat. No. 7,011,294 B1 also discloses an embodiment where a roller, which interacts with a wall of the valve housing, is rotatably mounted on the rear side of the closure member. This realization, however, also has disadvantages, among others with regard to the existing linear support on the wall of the valve housing and the high level of locally acting forces connected to this.

SUMMARY

It is the object of the invention to provide an advantageous vacuum valve of the type mentioned in the introduction where the seal is pressed in as uniform as possible a manner when the vacuum valve is in the closed state. This is achieved by a vacuum valve with one or more features of the invention.

In the case of the vacuum valve according to the invention, at least one support part is provided which is arranged on the rear side of the closure member remote from the valve seat and is pivotable in relation to the closure member about a pivot axis which is at right angles to the displacement direction of the valve rod and at right angles to the longitudinal axis of the valve opening.

The support part has a support surface, by way of which it is supported in the closed position of the closure member against an abutment surface of the valve housing. The abutment between the support surface of the support part and the valve housing is effected in an abutment plane which is inclined in relation to the displacement direction of the valve rod about an axis which is at right angles to the displacement direction and at right angles to the longitudinal axis of the valve opening, that is to say about an axis which is parallel to the pivot axis of the at least one support part. As a result of the bearing arrangement of the support part which is pivotable about the pivot axis, in the event of deviations in the dimensional tolerance of the parts caused by manufacturing tolerances, a full-surface abutment of the at least one support part against the valve housing and at the same time adaptation of the front side of the closure member to the position of the plane in which the valve seat lies is made possible. As a result, the pressing of the seal in the closed position of the closure member is effected in a very uniform manner.

The pivot axis, about which the support part is mounted so as to be pivotable on the closure member, can be formed, for example, by a bearing pin, in relation to which the support part is rotatable or which is rotatable in relation to the closure member. In another possible realization, the support part can comprise a cylindrical surface which interacts with a cylindrical surface of the closure member, a virtual rotational axis being realized which forms the pivot axis of the support part which is a right angles to the displacement direction of the valve rod and at right angles to the longitudinal axis of the valve opening. The support part could also comprise a spherical surface which interacts with a spherical surface of the closure member. As a result, a virtual pivot point is realized, i.e. the support part is pivotable about arbitrary pivot axes which extend through the virtual pivot point, that is to say also about a pivot axis which is at right angles to the displacement direction of the valve rod and at right angles to the longitudinal axis of the valve opening.

In an advantageous manner, the at least one support part consists of a synthetic plastics material, in particular a thermoplastic resin, for example PEEK. Realization in metal is also possible, in particular with a sliding coating produced from plastics material, for which purpose, for example, PTFE would be suitable.

The friction coefficient μ of the support surface of the at least one support part is preferably within the range of between 0.05 and 0.40.

By considering a central plane which is parallel to the displacement direction of the closure member, parallel to the longitudinal axis of the valve opening and penetrates the closure member centrally, it is expedient to have present at least one support part in each case on both sides of said central plane. The pivot axes of all the support parts coincide geometrically in this connection, i.e. they lie along a common straight line.

In an advantageous embodiment of the invention, the closure member is realized in a wedge-shaped manner in a side view (when seen in the direction of the pivot axis of the at least one support part). In this connection, the sealing surface and the seal are arranged in parallel planes which are inclined in relation to the displacement direction of the valve plate about an axis which is parallel to the pivot axis of the at least one support part, said inclination being in the opposite direction to the inclination of the abutment plane.

At least one sliding part can be arranged on the front side of the closure member next to the seal, several sliding parts being preferred. The at least one sliding part abuts, in this connection, against the valve housing with the closure member in the closed position. Such a sliding part consists in an advantageous manner of a synthetic plastic material, in particular a thermoplastic resin such as, for example, PEEK. In place of the arrangement of a least one separate sliding part, at least one slidingly-coated elevation could be provided, for example, on the closure member. Such a sliding coating could be effected, for example, by means of PTFE. As an alternative to this or in addition to it, at least one sliding part or at least one slidingly-coated elevation could be provided on the valve housing and could interact with a sliding surface of the closure member.

BRIEF DESCRIPTION OF THE SEVERAL VIEWS OF THE DRAWINGS

Further advantages and details of the invention are explained below by way of the accompanying drawing, in which.

DETAILED DESCRIPTION OF THE PREFERRED EMBODIMENTS

FIGS. 1 to 15 show a first exemplary embodiment of a vacuum valve according to the invention. The figures comprise different scales.

Figure 1:
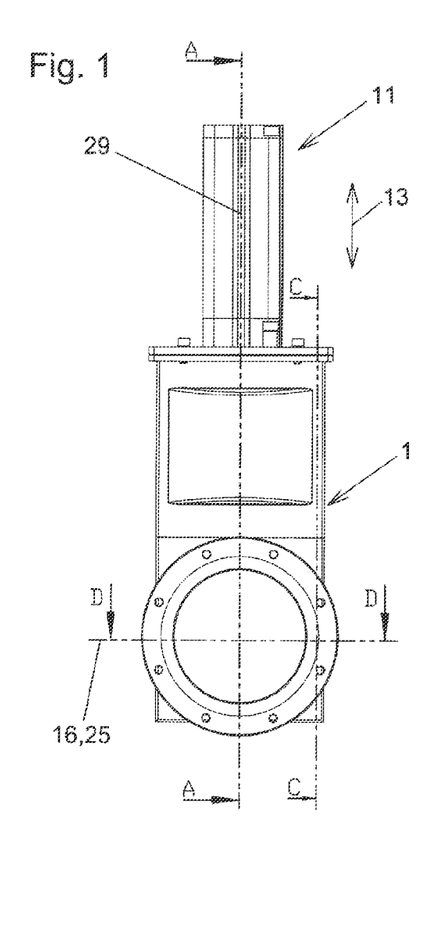
FIG. 1 shows a view of a vacuum valve according to the invention, in the open state.
Figure 2:
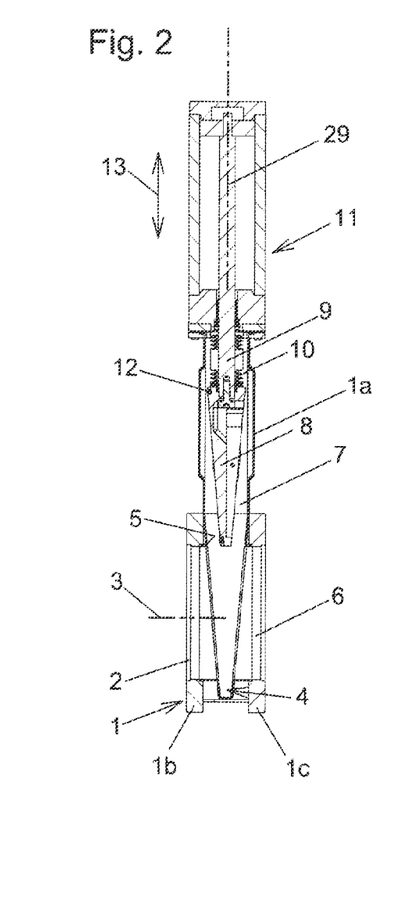
FIG. 2 shows a section along the line AA of FIG. 1.
Figure 3:
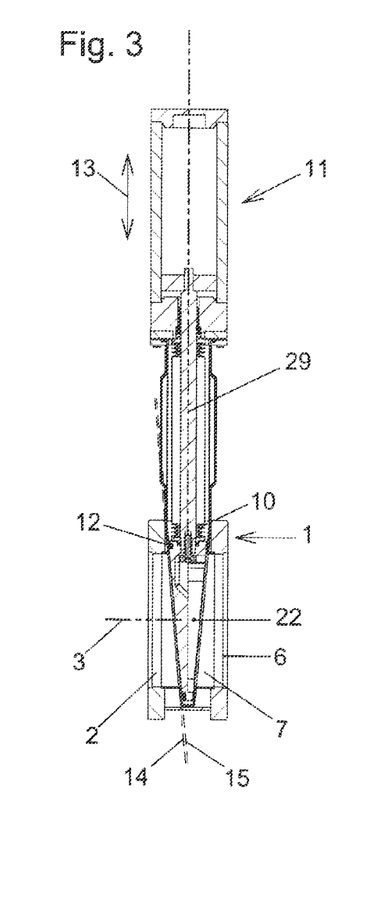
FIG. 3 shows a section analogous to FIG. 2 with the vacuum valve in the closed state.
Figure 4:
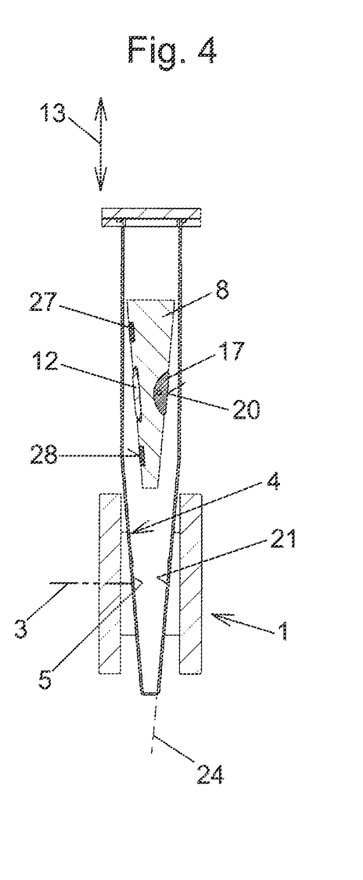
FIG. 4 shows a section along the line CC of FIG. 1.
Figure 5:
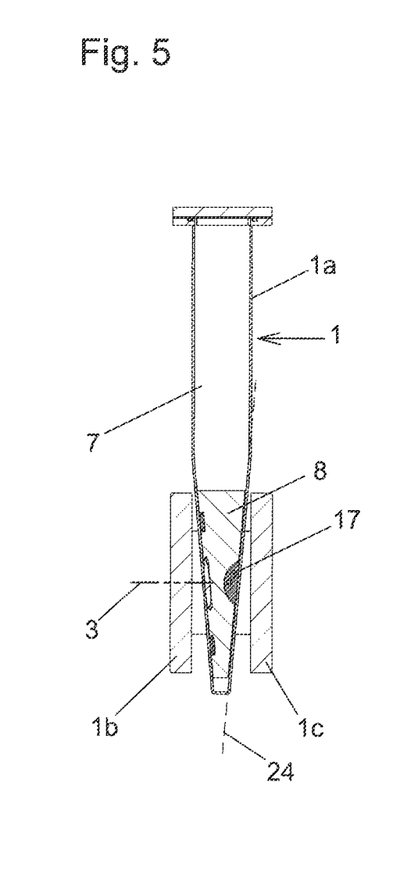
FIG. 5 shows a section analogous to FIG. 4 with the vacuum valve in the closed state.
Figure 6:
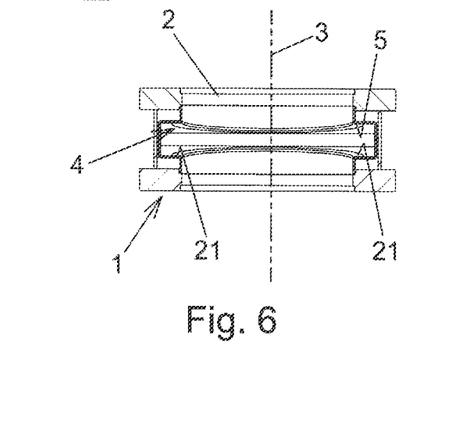
FIG. 6 shows a section along the line DD of FIG. 1.
Figure 7:
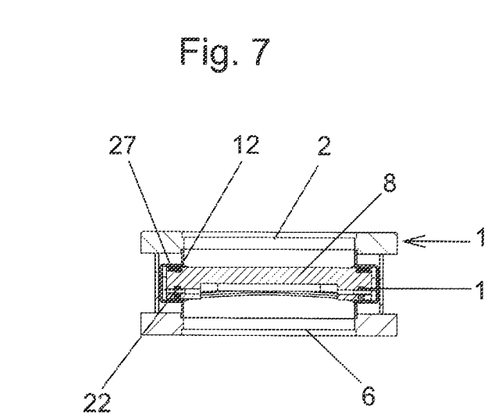
FIG. 7 shows a section analogous to FIG. 6 with the vacuum valve in the closed state.
Figures 8, 9, 10:
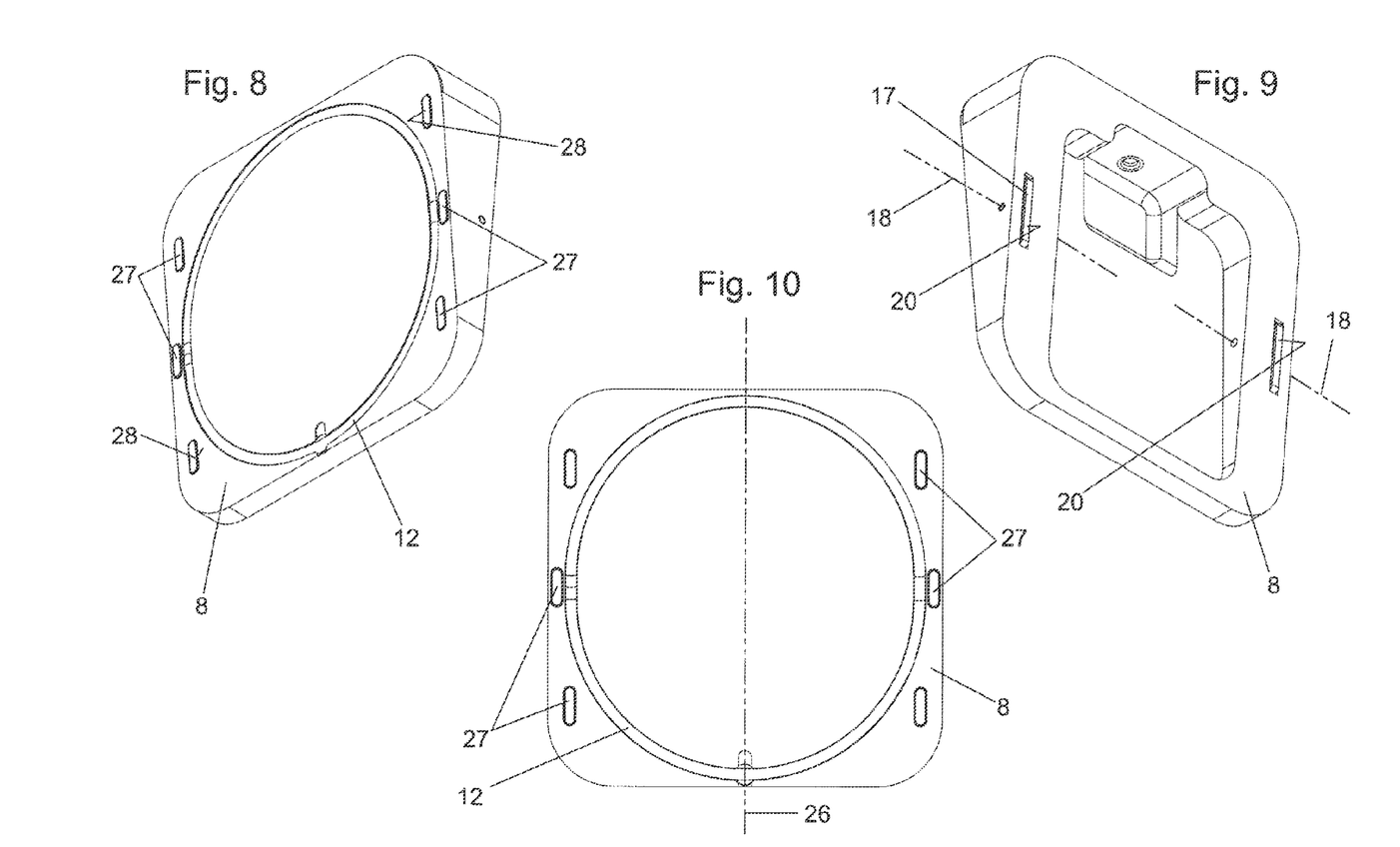
FIGS. 8 and 9 show perspective views of the closure member, in perspective from the front and in perspective from the back.
FIGS. 10 and 11 show a front view and rear view of the closure member.
Figure 11:
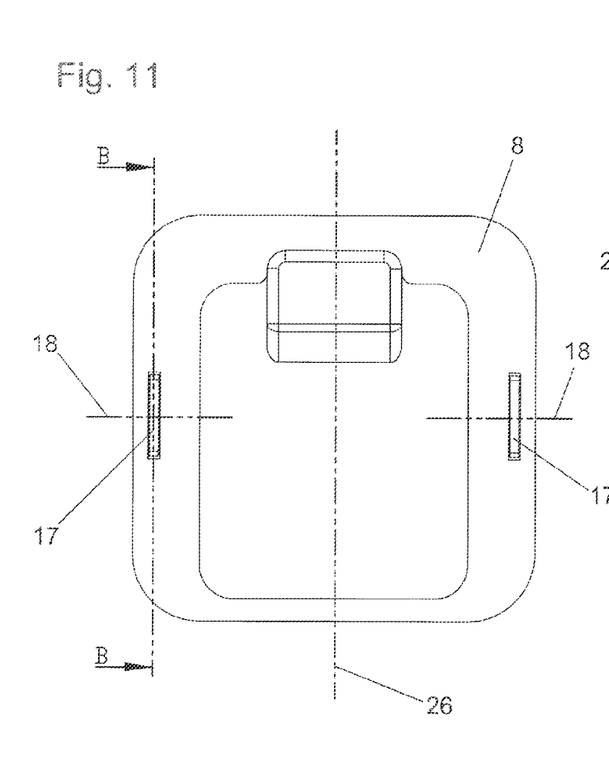
Figure 12:
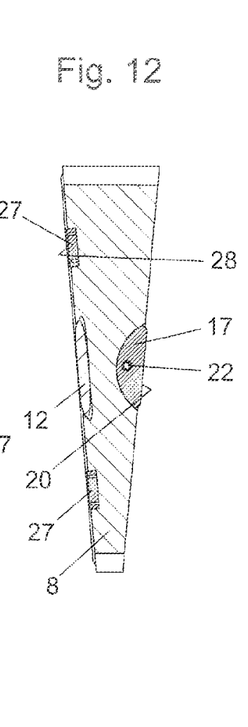
FIG. 12 shows a section along the line BB of FIG. 11.

The vacuum valve has a valve housing 1 with a valve opening 2 which comprises a longitudinal axis 3. The valve opening 2 is surrounded by a valve seat 4 which comprises a sealing surface 5.

Located opposite the valve opening 2, the valve housing 1 has a housing opening 6, the longitudinal axis of which lies parallel to the longitudinal axis 3, in particular lies along a common straight line with the longitudinal axis 3. The valve opening 2 and the housing opening 6 preferably have the same form, in the exemplary embodiment a circular form, and are the same size.

A straight-line through channel, which includes the valve opening 2, the housing opening 6 and the portion of the interior 7 of the valve housing lying in between, is realized through the valve housing when the vacuum valve is in the open state.

In the exemplary embodiment, the valve housing 1 has a basic body 1a which is produced from sheet metal and on which flanges 1b, 1c are welded in the form of solid parts. The valve housing 1 could also be realized in another manner.

A closure member 8 is arranged in the interior 7 of the valve housing 1 which forms a vacuum region of the vacuum valve. The closure member 8 is mounted on a valve rod 9. The valve rod is displaceable axially in a displacement direction 13 and in an opposite direction, that it to say is displaceable in parallel in the direction of its longitudinal axis 29. As a result of said axial displacement of the valve rod 9, the closure member 8 is adjusted between an open position, which it assumes when the vacuum valve is in the open state and in which it releases the through channel through the valve housing 1, cf. FIG. 2, and a closed position, in which the vacuum valve comprises its closed state and the through channel which extends through the valve housing 1 is sealed, cf. FIG. 3.

The valve rod 9 is guided out of the interior 7 of the valve housing 1 by means of a linear feedthrough. In the exemplary embodiment shown, a bellows 10 is provided for this purpose. A seal for guiding the valve rod 9 out of the valve housing could also be effected by means of at least one elastic sealing ring.

The portion of the valve rod 9 guided out of the valve housing 1 is connected to a piston of a pneumatic piston-cylinder unit 11. The valve rod 9 therefore also provides the piston rod of said piston-cylinder unit 11. A connecting member could also be provided between the valve rod 9 and at least one piston rod of a piston-cylinder unit. In the exemplary embodiment, the piston-cylinder unit 11 forms the drive for adjusting the closure member 8 between its open and closed position. Other drives could also be provided, for example electrically operated actuators. In principle, a manual drive could also be provided.

An elastic seal 12, which is pressed onto the sealing surface 5 of the valve seat 4 when the closure member 8 is in the closed position, is arranged on a front side of the closure member 8, which faces the valve seat 4 when the closure member 8 is in the closed position. The seal 12 is extensively closed, i.e. is realized in a ring-shaped manner.

In the exemplary embodiment, the seal 12 is realized in a circular manner, in other exemplary embodiments other extensively closed realizations, for example in the form of a rectangle with rounded corners, being possible. The form of the seal can be realized in a manner adapted to the form of the valve opening 2 and to the circumferential contour of the closure member 8 adapted thereto.

For example, the seal 12 is formed in a known manner of FKM (Viton), realizations produced from other materials also being possible and known, in particular FFKM.

In the exemplary embodiment, the seal 12 is realized as an O-ring seal and is arranged in a groove in the closure member 8. For example, the seal 12 could also be vulcanized onto the closure member 8.

Figure 19:
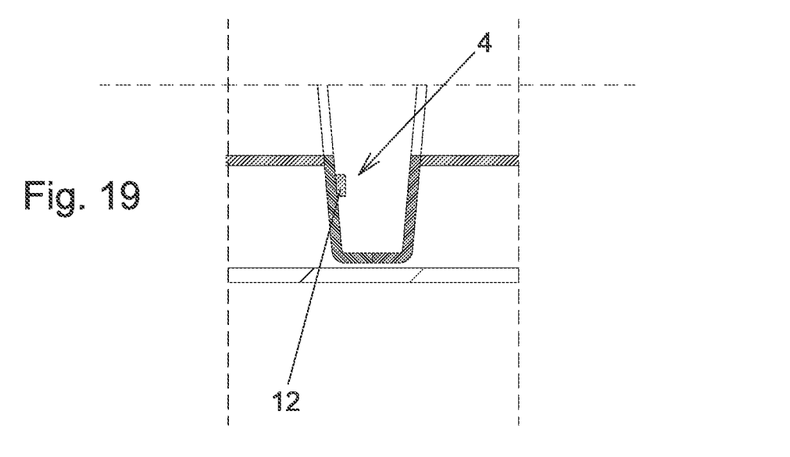
FIGS. 19 and 20 show an inverted arrangement of the seal and sealing surface.
Figure 20:
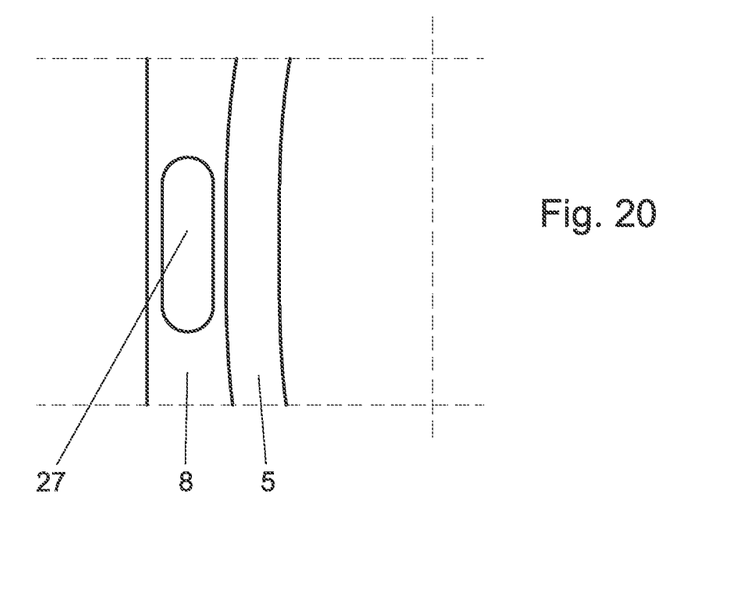

A reverse arrangement where the seal 12 is arranged on the valve seat 4 and the sealing surface 5 is arranged on the closure member 8 is also conceivable and possible, see FIGS. 19 and 20.

Figure 13:
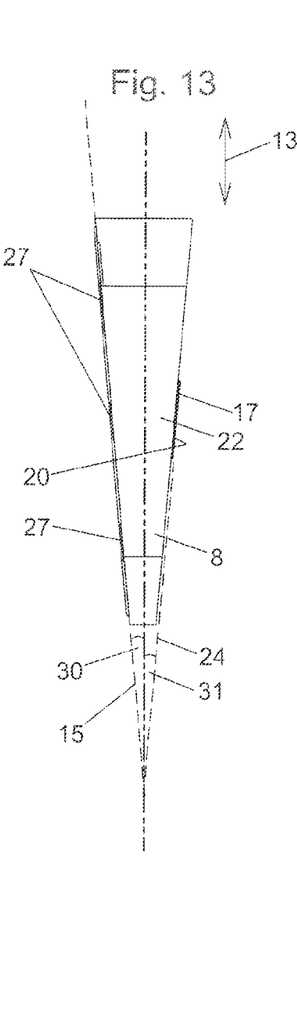
FIG. 13 shows a side view of the closure member.
Figure 14:
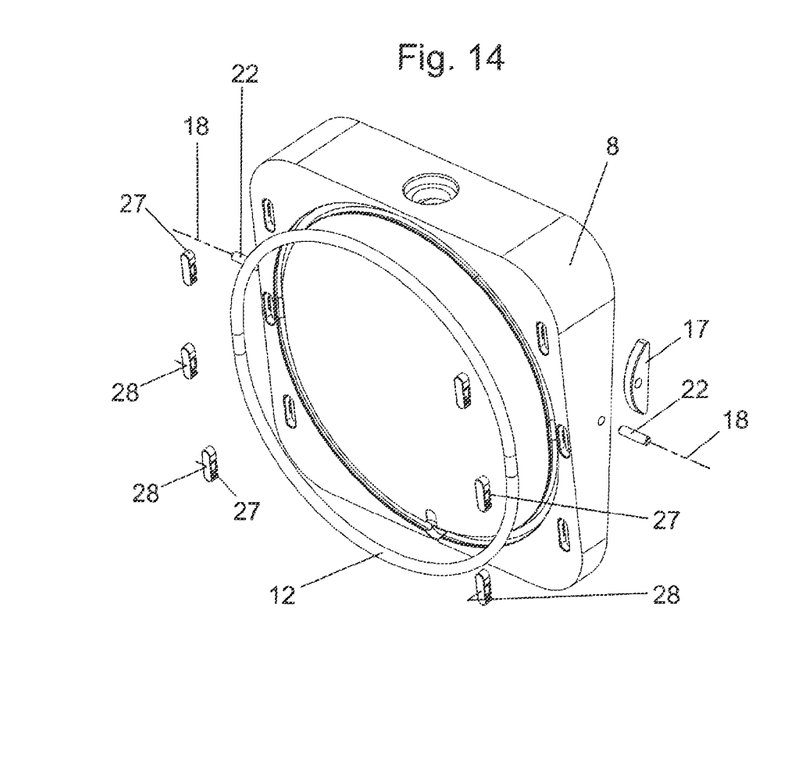
FIGS. 14 and 15 show exploded representations of the closure member.
Figure 15:
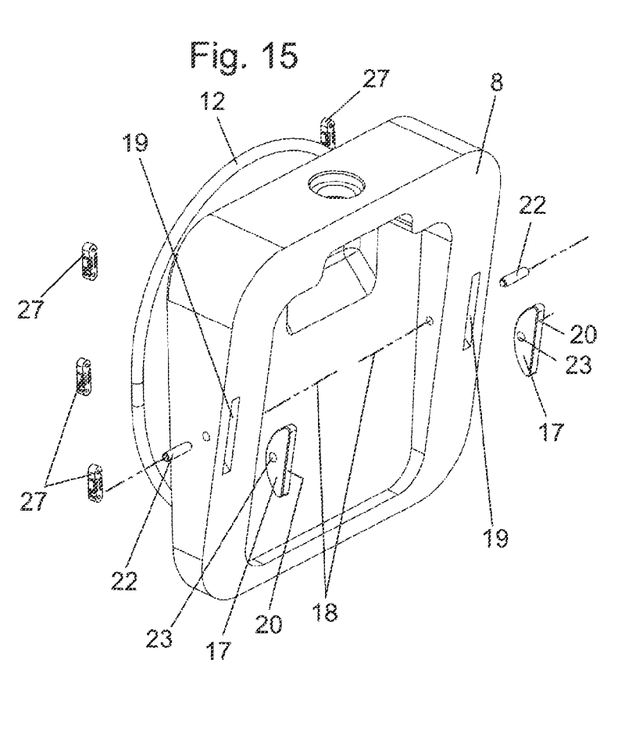

When seen in side view at right angles to the displacement direction 13 and at right angles to the longitudinal axis 3 of the valve opening 2, the closure member 8 is realized in a wedge-shaped manner, cf. FIG. 13. In this connection, the sealing surface 5 and the seal 12 arranged in parallel planes 14, 15 (cf. FIG. 3), said planes 14, 15 being inclined in relation to the displacement direction 13, about an axis 16 which is at right angles to the displacement direction 13 and at right angles to the longitudinal axis 3 of the valve opening 2. The angle 30 of the inclination (cf. FIG. 13) is advantageously within the range of between 1° and 45°, preferably within the range of between 4° and 10°.

Support parts 17 are mounted so as to be pivotable on the closure member 8 on the rear side of the closure member 8 remote from the valve seat 5 in the closed position of the closure member 8. The pivot axes 18, about which the support parts 17 are pivotable in relation to the closure member 8, in this connection lie in a common straight line, in other words the pivot axes 18 of the support parts 17 coincide. The pivot axes 18 are at right angles to the displacement direction 13 and at right angles to the longitudinal axis 3 of the valve opening 2.

The support parts 17 have level support surfaces 20. In the closed position of the closure member 8, a respective support part 17 abuts with its support surface 20 against an abutment surface 21 of the valve housing 1. The abutment surface 21 of the valve housing 1 is consequently situated in a region of the valve housing 1 which faces the interior 7 of the valve housing 1 and surrounds the housing opening 6. A common continuous abutment surface 21 of the valve housing which surrounds the housing opening 6 is preferably provided for all the support parts 17.

In the exemplary embodiment, slot-shaped indentations 19, into which the support parts 17 are inserted over a large part of their extension, are realized on the rear side of the closure member 8. In the flattened regions in which the support parts 17 project out of the indentations 19, the support parts 17 comprise support surfaces 20.

The pivot axes 18 are realized in the exemplary embodiment by bearing pins 22 which cross the respective indentation 19 of the closure member 8 and project in bores which are arranged in the walls and define the indentation 19 on both sides. The bearing pins 22 penetrate through openings 23 through the support parts 17 and the support parts 17 are pivotable in relation to the bearing pins 22. A rigid or integral realization of the support parts 18 with bearing pins is also conceivable and possible, the bearing pins in this case possibly being able to rotate in the bores of the valve housing 1.

The abutment between the support surface 20 of the respective support part 17 and the abutment surface 21 of the valve housing 1 or the respective abutment surface 21 of the valve housing 1 is effected in an abutment plane 24. The abutment plane 24 is the same for all the support parts 17. The angle 31 of the inclination (cf. FIG. 13) is advantageously within the range of between 1° and 45°, preferably within the range of between 4° and 10°. This abutment surface is inclined in relation to the displacement direction 13 about an axis 25 which is at right angles to the displacement direction 13 and at right angles to the longitudinal axis 3 of the valve opening 2.

The planes 14, 15, on the one hand, and the abutment plane 24, on the other hand, are inclined in opposite directions in relation to the displacement direction 13.

In the exemplary embodiment, on both sides of a central plane 26 which penetrates the closure member 8 centrally and is at right angles to the pivot axes 18, precisely one support part 17 is mounted so as to be pivotable on the closure member 8. More than one pivotably mounted support part 17 could also be provided on each side of the central plane 26, the pivot axes 18 of all the support parts 17 lying along a common straight line. In principle, one single support part which is penetrated by the central plane 26 could also be provided.

Sliding parts 27 are arranged on the front side of the closure member 8 next to the seal 12, preferably outside the region surrounded by the seal 12. In the closed position of the closure member 8, the sliding parts 27 abut against sliding surfaces 28 of the valve housing 1. In this connection, several sliding parts 27 are arranged in each case on both sides of the central plane 26 in the exemplary embodiment, as is preferred. An elongated (=strip-shaped) sliding part 27 could also be arranged, for example, in each case on both sides of the central plane 26.

In the event of an embodiment where the seal is arranged on the valve seat 4 and the sealing surface is arranged on the closure member 8, the sliding parts 27 would be arranged next to the sealing surface that is arranged on the closure member 8, preferably outside the region surrounded by the sealing surface 5.

To close the vacuum valve proceeding from its open state, the closure member 8 is displaced from its open position into its closed position. Over a last part portion of the adjustment path of the closure member up to achieving its closed position, the support parts 17 form a sliding bearing arrangement for the closure member 8 in relation to the valve housing 1 by means of their abutment against the valve housing 1. As a result of the pivotable bearing arrangement of the support parts 17 about the common pivot axis 18, on the one hand a respective support part 17 can adapt by way of its support surface 20 to the abutment surface 21 of the valve housing 1 in order to achieve a full-surface abutment. On the other hand, whilst the support parts 17 abut with their support surfaces 20 in a full-surface manner against the abutment surface 21 or a respective abutment surface 21, the closure member 8 is able to pivot about the pivot axis 18 in order to adapt the front side of the closure member 8 to the position of the valve seat 4. Such possible pivoting about the pivot axis 18 (which is very small, that is to say, for example, smaller than 1°) can be effected in this connection against the elasticity of the valve rod 9. An elastic or pivotable connection between the closure member 8 and the valve rod 9 is also conceivable and possible.

The sliding parts 27 which are arranged on the front side of the closure member 8 form a sliding bearing arrangement for the closure member in relation to the valve housing 1 over a last part portion of the adjustment path of the closure member up to achieving the closed position of the closure member. In addition, the sliding parts 27 distance the closure member 8 from the valve housing 1 when the closure member is in the closed position and consequently define the pressing of the seal 12.

In place of separate sliding parts 27, the closure member 8 could be provided, for example, with elevations with sliding coatings which assume the function of the sliding parts. Such elevations or separate sliding parts could also be provided on the valve housing. Without provision of separate sliding parts or of such elevations, the closure member 8 could be provided with a sliding coating on the front side over a region which abuts against the valve housing when the closure member is in the closed position. The pressing of the seal 12 could in this case be limited as a result of the seal 12 being provided with a sufficiently deep groove in the closing member, into which groove the seal 12 can be displaced fully when the closure member is in the closed position.

The adjusting of the closure member over the adjustment path from the open position of the closure member up to the closed position of the closure member is effected, apart from the last portion of said adjustment path in which force is transmitted from the valve housing 1 to the closure member 8 (that is to say by means of the abutment of the support parts 17 and/or sliding pars 27 against the valve housing), in the form of a straight-line parallel displacement of the closure member 8 in the displacement direction 13. In the named last portion of the adjustment path, the closure member 8 can tilt slightly and/or the closure member can be displaced in the direction of the longitudinal axis 3 of the valve opening 2.

The wedge form of the closure member 8 could also be omitted on the front side thereof. In the case of such an embodiment, the closure member 8 would be displaced in the direction of the valve seat 4 and pressed against the valve seat 4 as a result of the support surface 20 of the respective support part 17 abutting against the valve housing 1 over the last part portion of the adjustment path of the closure member up to achieving the closed position of the closure member. This slight movement of the closure member 8 in the direction of the valve seat 4 could be effected against the elasticity of the valve rod 9.

Figure 16:
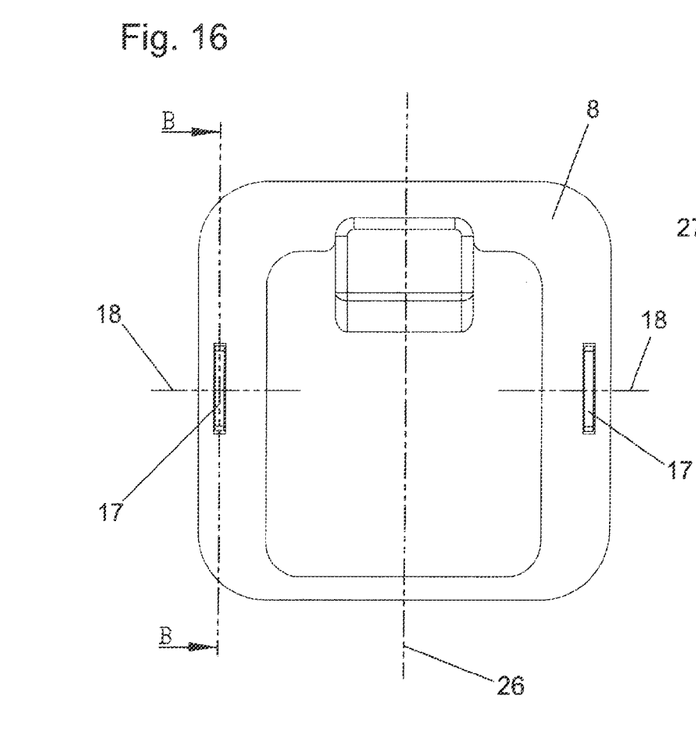
FIGS. 16 to 18 show representations analogous to FIGS. 11 to 13 for a second exemplary embodiment of the invention.
Figures 17, 18:
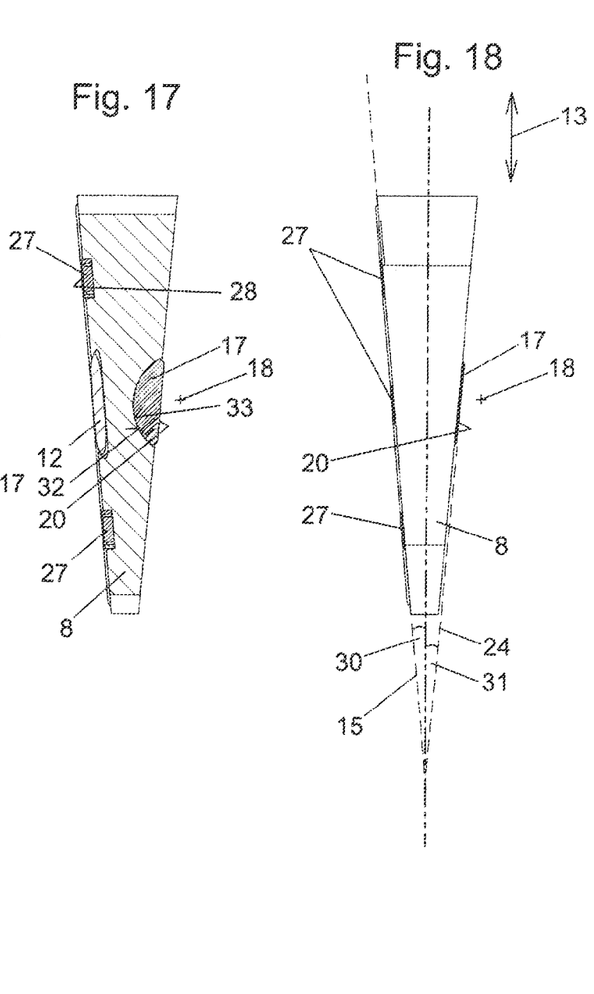

Apart from the differences described below, the second exemplary embodiment of the invention shown in FIGS. 16 to 18 corresponds to the first exemplary embodiment of the invention described beforehand, the description of the first exemplary embodiment of the invention as well as the possible variations hereto also relating moreover to the second exemplary embodiment of the invention.

In the case of said second exemplary embodiment of the invention, the respective support part 17 comprises a cylindrical surface 32 on the side facing the closure member and the respective indentation of the closure member 8 has a corresponding cylindrical surface 33 against which the cylindrical surface 32 of the support part 17 abuts. The longitudinal axes of the interacting cylindrical surfaces form, in this connection, a (virtual) pivot axis 18 which is at right angles to the displacement direction 13 and at right angles to the longitudinal axis 3 of the valve opening 2.

In place of corresponding cylindrical surfaces 32, 33 which abut against one another, a respective support part 17 and a respective indentation of the closure member 8 could also comprise corresponding spherical surfaces which abut against one another. A section through the interacting spherical surfaces would then appear analogously to FIG. 17 (the line of intersection however, would be somewhat further away from the side edge of the closure member 8). A virtual pivot point would consequently be realized at the position of the central point of the interacting spherical surfaces. A respective support part would consequently also be pivotable about a pivot axis which is at right angles to the displacement direction 13 and at right angles to the longitudinal axis 3 of the valve opening 2.

When speaking of interacting cylindrical surfaces or spherical surfaces of the respective support part 17 and of the closure member 8, this therefore means in this connection corresponding portions of a complete, extensively closed cylindrical surface (cylinder lateral surface) or spherical surface.

| Key to the reference numerals: | |
| --- | --- |
| 1 | Valve housing |
| 1a | Basic body |
| 1b | Flange |
| 1c | Flange |
| 2 | Valve opening |
| 3 | Longitudinal axis |
| 4 | Valve seat |
| 5 | Sealing surface |
| 6 | Housing opening |
| 7 | Interior |
| 8 | Closure member |
| 9 | Valve rod |
| 10 | Bellows |
| 11 | Piston-cylinder unit |
| 12 | Seal |
| 13 | Displacement direction |
| 14 | Plane |
| 15 | Plane |
| 16 | Axis |
| 17 | Support part |
| 18 | Pivot axis |
| 19 | Indentation |
| 20 | Support surface |
| 21 | Abutment surface |
| 22 | Bearing pin |
| 23 | Through opening |
| 24 | Abutment plane |
| 25 | Axis |
| 26 | Central plane |
| 27 | Sliding part |
| 28 | Sliding surface |
| 29 | Longitudinal axis |
| 30 | Angle |
| 31 | Angle |
| 32 | Cylindrical surface |
| 33 | Cylindrical surface |

The invention claimed is:

1. A vacuum valve comprising
    a valve housing which comprises a valve opening having a longitudinal axis, and a valve seat which surrounds the valve opening;
    a closure member which is adjustable between an open position, in which the vacuum valve is open, and a closed position, in which the vacuum valve is closed;
    a valve rod on which the closure member is mounted and which is axially adjustable in a displacement direction and in an opposite direction for adjusting the closure member between the open position and the closed position;
    an elastic seal arranged on a front side of the closure member or on the valve seat of the valve housing;
    a sealing surface which is arranged on the valve seat of the valve housing, if the elastic seal is arranged on the front side of the closure member, or on the front side of the closure member, if the elastic seal is arranged on the valve seat of the valve housing, and against which the seal abuts in the closed position of the closure member; and at least two support parts arranged on a rear side of the closure member remote from the valve seat, the support parts each comprise a support surface which is supported on the valve housing in the closed position of the closure member, wherein the abutment between the support surface and the valve housing is effected in an abutment plane which is inclined in relation to the displacement direction about an axis which is at right angles to the displacement direction and at right angles to the longitudinal axis of the valve opening, and the support parts are pivotable in relation to the closure member about pivot axes which are aligned along a straight line at right angles to the displacement direction and at right angles to the longitudinal axis of the valve opening, wherein with respect to a central plane which is at right angles to the pivot axes and penetrates the closure member centrally at least one of the support parts is arranged on one side of this central plane and at least one of the support parts is arranged on an opposite side of this central plane.

2. The vacuum valve as claimed in claim 1, wherein a majority of at least one of the support parts is arranged in an indentation of the closure member and projects out of the indentation of the closure member in a region adjoining the support surface.

3. The vacuum valve as claimed in claim 1, wherein the pivot axis is formed by a bearing pin, in relation to which the support part is rotatable or which is mounted so as to be rotatable in relation to the closure member.

4. The vacuum valve as claimed in claim 1, wherein the support part comprises a cylindrical surface or a spherical surface which interacts with a complementary cylindrical surface or spherical surface of the closure member.

5. The vacuum valve as claimed in claim 1, wherein the support part is formed of a plastic material.

6. The vacuum valve as claimed in claim 1, wherein the sealing surface and the seal are arranged in parallel planes which are inclined in relation to the displacement direction about an axis which is at right angles to the displacement direction and at right angles to the longitudinal axis of the valve opening, in an opposite direction to the inclination of the abutment plane.

7. The vacuum valve as claimed in claim 1, wherein at least one sliding part, which abuts against the valve housing in the closed position of the closure member, is arranged on the front side of the closure member next to the seal or next to the sealing surface.

8. The vacuum valve as claimed in claim 7, wherein at least one of the sliding parts is arranged in each case on oppositely situated sides of a central plane which lies parallel to the displacement direction, parallel to the longitudinal axis of the valve opening and penetrates the closure member centrally.

* * * * *